(12) United States Patent
Koepff

(10) Patent No.: US 6,267,208 B1
(45) Date of Patent: Jul. 31, 2001

(54) PEDAL TRAVEL SIMULATOR

(75) Inventor: Georg Koepff, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,954

(22) PCT Filed: Mar. 23, 1999

(86) PCT No.: PCT/DE99/00830

§ 371 Date: Apr. 21, 2000

§ 102(e) Date: Apr. 21, 2000

(87) PCT Pub. No.: WO00/10848

PCT Pub. Date: Mar. 2, 2000

(30) Foreign Application Priority Data

Aug. 21, 1998 (DE) .............................................. 198 38 037

(51) Int. Cl.$^7$ ..................................................... B60L 7/00
(52) U.S. Cl. ........................................... 188/164; 188/156
(58) Field of Search ..................................... 188/164, 158, 188/156, 161; 303/3, 15, 20, 113.4, 155, 158, DIG. 3; 74/478

(56) References Cited

U.S. PATENT DOCUMENTS 6,105,737 * 8/2000 Weigert et al. ....................... 188/158

* cited by examiner

Primary Examiner—Robert J. Oberleitner
Assistant Examiner—Devon Kramer
(74) Attorney, Agent, or Firm—Ronald E. Greigg; Edwin E. Griegg

(57) ABSTRACT

A brake pedal path simulator, with a restoring device which exerts a restoring force with a progressive force-path characteristic curve on a pedal. The restoring device includes at least two permanent magnets, whose mutually repelling poles are oriented toward each other, one of which magnets is connected to the pedal and is guided in a direction of the resultant repelling magnetic force of the other magnet.

21 Claims, 3 Drawing Sheets

PEDAL TRAVEL SIMULATOR

The invention relates to a pedal path simulator as set forth hereinafter.

Pedal path simulators of this type are used in particular in electromotive brakes, as disclosed, for example, in U.S. Pat. No. 4,658 939. The change in the pedal position is converted into an electrical signal which is supplied to a control unit which in turn triggers the wheel brakes.

The purpose of this type of pedal path simulators is to give the driver a pedal feel which corresponds as much as possible to that in conventional hydraulic brakes with vacuum brake boosters and master cylinders.

For example, DE 43 24 041 A1 has disclosed a set point transmitter for controlling a brake system, having a path simulator which includes a piston in a cylinder. On the one end, the piston is acted on by a spring and on the other end, it is loaded by a pre-stressed gas cushion. In the rest position of the piston, the spring functions as a compression spring. When the set point transmitter is actuated, in the course of the movement of the piston counter to the compression force of the gas cushion, the spring begins to function as a tension spring. The resultants of the spring force and compression force lead to a distinct progressivity of the characteristic curve of the path simulator. The path signal and/or pressure signal is converted by means of a measurement converter into an electrical signal in order to trigger a brake system.

Currently, it is not uncommon for the generation of a characteristic pedal path-pedal force characteristic curve with conventional spring elements to lead to large problems.

The object of the invention, therefore, is to produce a pedal path simulator which is in a position to simulate progressive pedal path-pedal force characteristic curves of the type required in motor vehicles in a manner that is technically simple to achieve.

OBJECTS AND ADVANTAGES OF THE INVENTION

This object is attained according to the invention with a pedal path simulator of the type described at the beginning and has the advantage that the embodiment of the restoring means with at least two magnets, whose mutually repelling poles are oriented toward each other, one of the magnets is connected to the pedal and is guided so that the magnet can move in the direction of the resultant repelling magnetic force, and permits complicated progressive pedal characteristic curves to be simulated in a relatively simple fashion.

In this connection, it is particularly advantageous that the embodiment of the restoring means has two magnets, one magnet is considered to be the armature and the other magnet. This is considered to be the armature counterpart, makes it possible to produce practically any arbitrary characteristic curve.

It is also advantageous that such an embodiment of the pedal path simulator permits a very compact construction. Furthermore, the end wall is not required to protrude into the pedal space of the vehicle.

The magnets can be embodied in an extremely wide variety of forms. One advantageous embodiment provides that the magnets are ferromagnetic permanent magnets.

A particularly advantageous embodiment provides that these permanent magnets are magnetic disks which are respectively disposed in a cup that is adapted to them and is made of a soft magnetic material. Such an embodiment is simple to produce and permits practically any arbitrary form of the cups and therefore any arbitrary form of the armature and armature counterpart.

Preferably the provision is made that a non-magnetic sleeve is disposed between the cup and the magnetic disk.

In order to produce the desired pedal characteristic curve, the provision is advantageously made that the characteristic curve of the repelling magnetic force can be changed as a function of the pedal path by means of a shaping of the magnets. It has turned out that by changing the shape of both magnets, an extremely wide variety of force-path characteristic curves can be produced, for example a magnetic force that increases with increasing path can be produced, however it is also possible to produce a force which, with increasing path, increases, then decreases, and increases again, similar to the characteristic curves that are known in switching magnets.

A particularly advantageous embodiment provides that the cup remote from the pedal has a conical shape, with a cone angle that opens on the end remote from the pedal. This produces a force-path characteristic curve which is very similar to that of a known pedal. By changing the cone angle, the force-path characteristic curve can be changed and fixed.

The magnet that can be moved with the pedal is guided by means of a guide rod which is supported so that magnet can slide.

In particular with a view to an advantageous additional guidance when the two repelling magnetic poles must be moved very close to each other, i.e. when the pedal is depressed forcefully, the provision is made that the cup remote from the pedal encompasses the cup oriented toward the pedal at least partially when the pedal is depressed.

In another embodiment, the magnets are advantageously electromagnets whose field intensities can be influenced by the current intensity.

In order to transmit the pedal position to a control unit or the like, the provision is made that sensors for detecting the pedal position are provided on a housing that contains the magnets.

BRIEF DESCRIPTION OF THE DRAWINGS

Other features and advantages of the invention or the subject of the following description and the graphic depiction of an exemplary embodiment of the invention.

DESCRIPTION OF THE EXEMPLARY EMBODIMENTS

Figure 1:
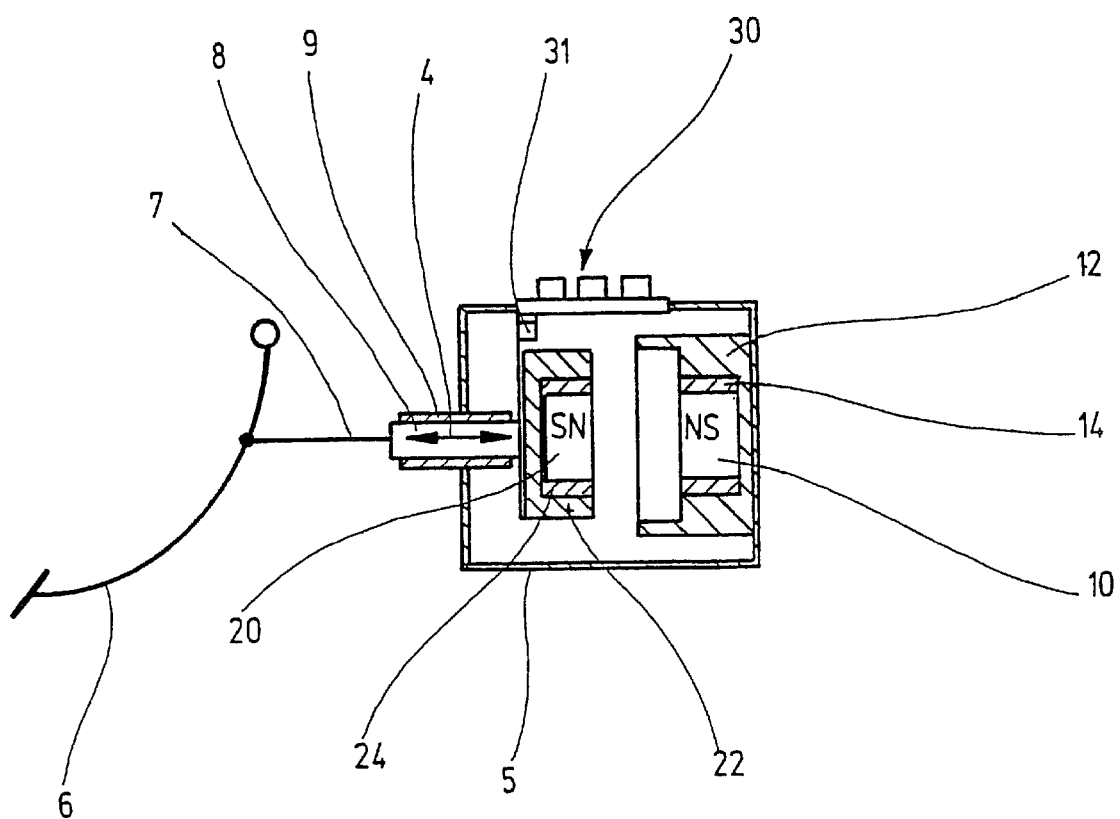
FIG. 1 schematically depicts an embodiment of a pedal path simulator that makes use of the invention.

A pedal path simulator, shown in FIG. 1, includes a housing 5, in which a first magnet 10 is fastened, for example a permanent magnet as shown, which is embodied as disk-shaped and, encompassed by a non-ferromagnetic sleeve 14, is disposed in a cup 12. Another magnet 20, for example also a permanent magnet, is oriented toward this magnet 10 in such a way that the two repelling poles, in FIG. 1 the North poles, are oriented toward each other. The second magnet 20 is likewise disposed in a cup 20 by way of a non-ferromagnetic sleeve 24.

As can be seen in particular from FIG. 1, in order to produce a particularly favorable guidance, the provision is made that the cup 12 remote from the pedal 6 at least partially encompasses the cup 22 oriented toward the pedal 6 when the pedal 6 is depressed.

The second magnet 20 is connected to a pedal 6 by means of a pedal rod 7, a guide rod 8 which is supported so that the rod can slide in a guide 9. An actuation of the pedal 6 thus produces a movement of the magnet 20 along its axis that connects the two magnetic poles.

An actuation of the pedal 6 produces a movement of the magnet 20 in the axial direction of the guide rod 8, as schematically depicted by the double arrow 4. A depression of the pedal 6 thus leads to the fact that the magnet 20 coupled to the pedal 6 moves toward the magnet 10 that is disposed in a stationary fashion in the housing 5. Since the repelling poles of the two magnets are now oriented toward each other, a reduction of the distance between the two magnets 10, 20 leads to a progressively increasing repelling force and thereby to a progressively increasing actuation force $F_P$ of the pedal 6.

Figure 2:
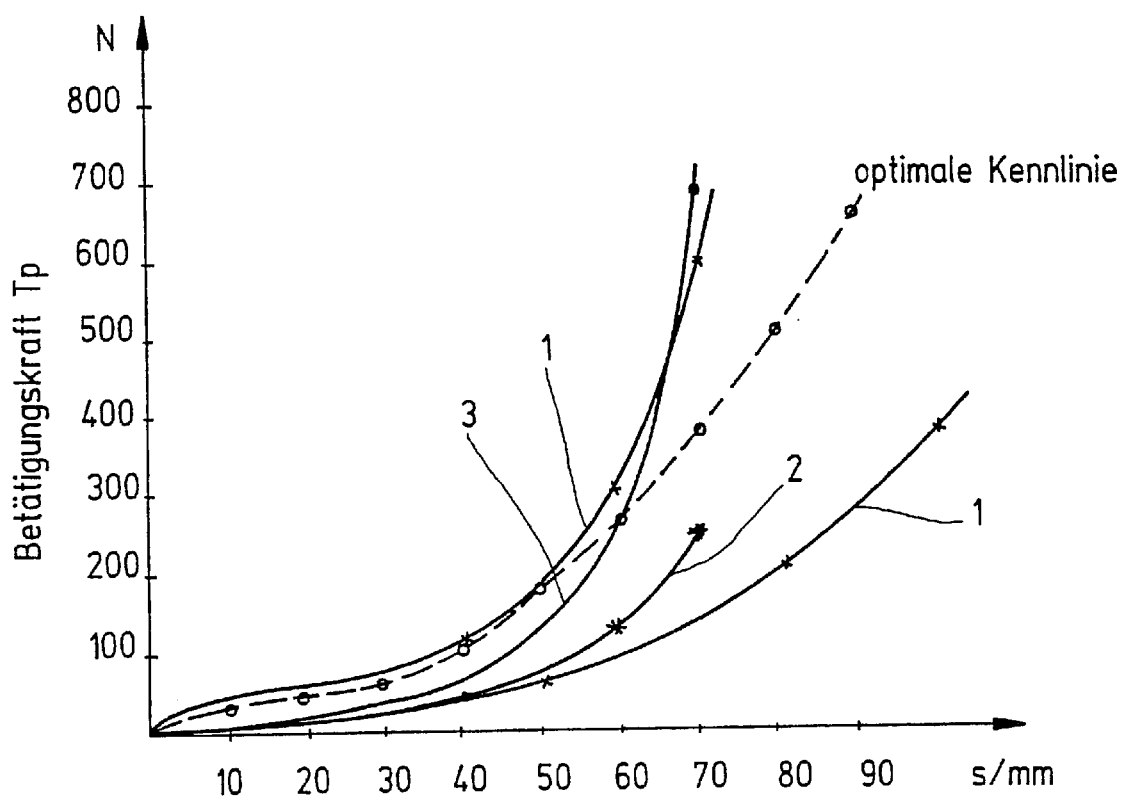
FIG. 2 schematically depicts the pedal characteristic curve of different pedal path simulators.

The pedal characteristic curve, i.e. the actuation force $F_P$ as a function of the actuation paths of a pedal path simulator described above in connection with FIG. 1 is schematically depicted in FIG. 2. The curve labeled with the numeral 2 thereby corresponds to the pedal force-pedal path characteristic curve when barium ferrite magnets are used. The curve labeled with the numeral 3 corresponds to the pedal force-pedal path characteristic curve when samarium cobalt magnets are used. The curves labeled with the numeral 1 depict the tolerance limits that are provided in pedal characteristic curves for motor vehicles. Furthermore, a pedal force-pedal path behavior is depicted, which is labeled "optimal characteristic curve".

Figure 3:
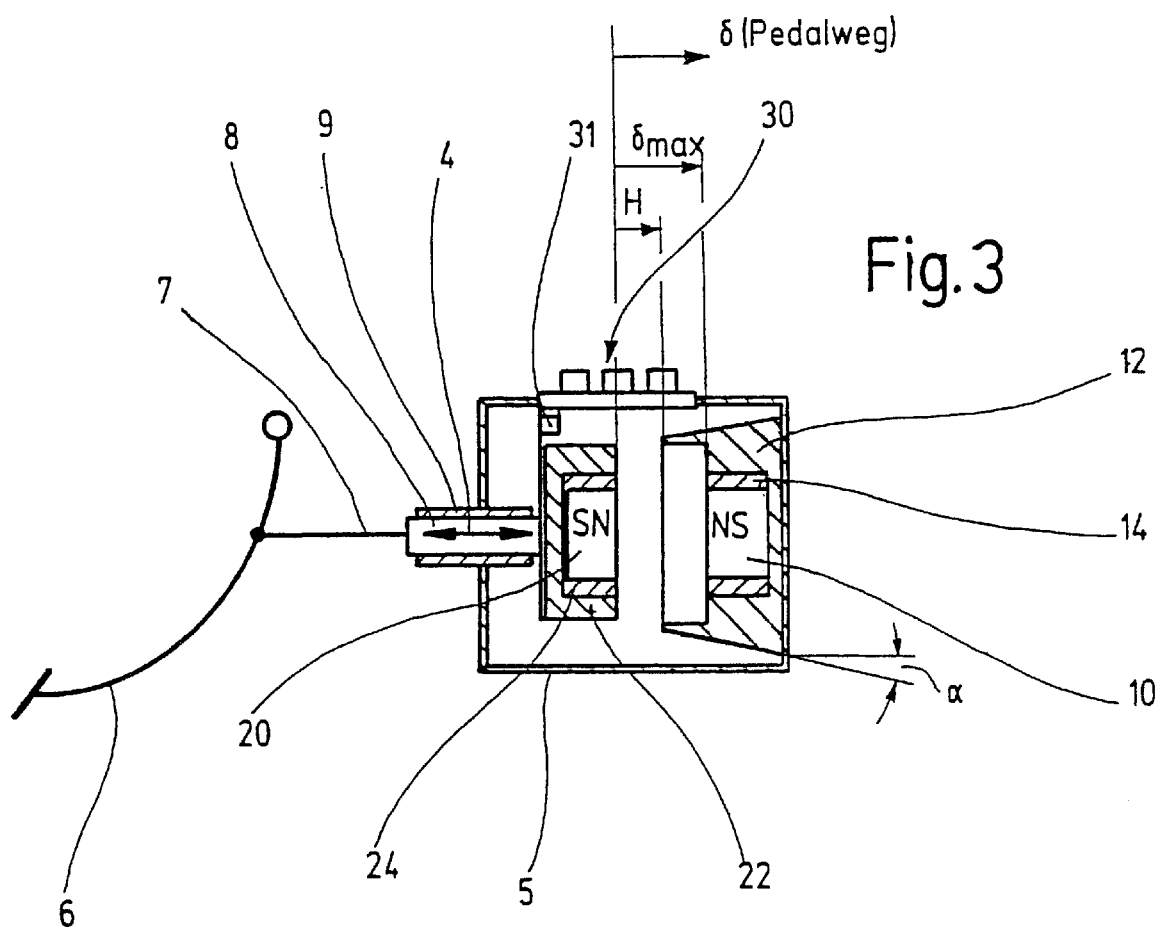
FIG. 3 shows another embodiment of a pedal path simulator according to the invention.

In another embodiment of a pedal path simulator, shown in FIG. 3, those elements which are identical to those in the first pedal path simulator shown in FIG. 1 are provided with the same reference numerals so that in regard to their description, the explanations made with respect to the first exemplary embodiment can be completely taken into account.

In contrast to the first exemplary embodiment shown in FIG. 1, in the second exemplary embodiment shown in FIG. 3, the cup 12 remote from the pedal 6 has a conical shape with a cone angle α that opens on the end remote from the pedal 6. The pedal path simulator shown in FIG. 3 achieves the pedal characteristic curve shown in FIG. 2 the best since in comparison to cups that are not embodied as conical on the end remote from the pedal, a displacement of the magnet work toward greater pedal paths is now possible.

Figure 4:
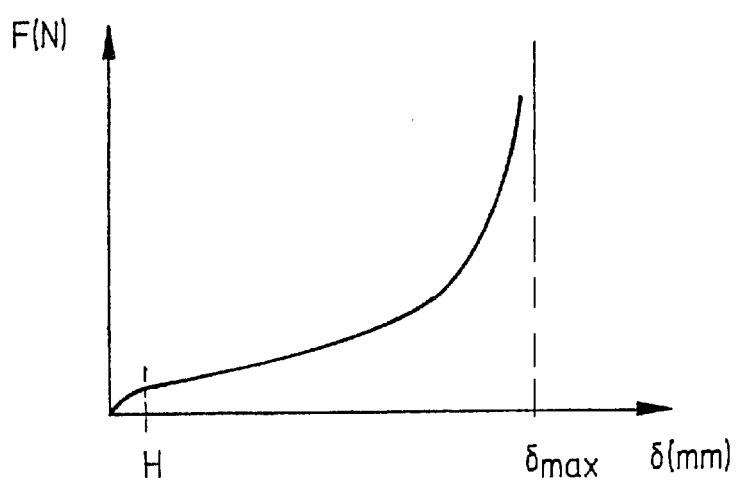
FIG. 4 shows the force-path characteristic curve of the pedal path simulator shown in FIG. 3.

The characteristic curve of this pedal path simulator is schematically depicted in FIG. 4. As can be seen from FIG. 4, the actuation force increases with increasing pedal path δ, wherein the characteristic curve has a progression that is similar to the force-path progression of an intrinsically known pedal. At the beginning of the pedal stroke, a slight force increase is produced at a pedal path H. This is adjoined by a slightly progressive course of the pedal force-path characteristic curve, which has a sharply progressive course in the second half of the overall pedal path.

In order to detect the position of the pedal 6, for example three redundant pedal sensors 30 can be provided on the housing 5, wherein these pedal sensors 30 can be controlled by an initiator 31 that is coupled to the movable magnet 10. If the initiator 31 passes the pedal sensors 30, for example the three sensors as shown in FIG. 1, then it is therefore easily possible to convert a position of the pedal into an electrical signal.

The foregoing relates to a preferred exemplary embodiment of the invention, it being understood that other variants and embodiments thereof are possible within the spirit and scope of the invention, the latter being defined by the appended claims.

What is claimed is:

1. A brake pedal path simulator, comprising a restoring means which exerts a restoring force with a progressive force-path characteristic curve on a pedal (6), in which the restoring means includes at least first and second magnets (10, 20), whose mutually repelling poles are oriented toward each other, said second magnet is connected to the pedal (6) and is guided so that the magnet moves in a direction of a resultant repelling magnetic force of said first magnet.

2. The pedal path simulator according to claim 1, in which the first and second magnets (10, 20) are ferromagnetic permanent magnets.

3. The pedal path simulator according to claim 2, in which the first and second permanent magnets are magnetic disks which are each disposed in a respective cup (12, 22) made of a soft magnetic material.

4. The pedal path simulator according to claim 3, in which a non-magnetic sleeve (14, 24) is respectively disposed between the respective cups (12, 22) and the first and second magnetic disks (10, 20).

5. The pedal path simulator according to claim 3, in which a characteristic curve of the repelling magnetic force is changed as a function of the pedal path by means of a shaping of the cup (12).

6. The pedal path simulator according to claim 4, in which a characteristic curve of the repelling magnetic force is changed as a function of the pedal path by means of a shaping of the cup (12).

7. The pedal path simulator according to claim 3, in which the cup (12) remote from the pedal has a conical shape with a cone angle (α) that opens toward the end of the cup (12) remote from the pedal.

8. The pedal path simulator according to claim 4, in which the cup (12) remote from the pedal has a conical shape with a cone angle (α) that opens toward the end of the cup (12) remote from the pedal.

9. The pedal path simulator according to claim 5, in which the cup (12) remote from the pedal has a conical shape with a cone angle (α) that opens toward the end of the cup (12) remote from the pedal.

10. The pedal path simulator according to claim 3, in which the cup (12) remote from the pedal (6) at least partially encompasses the cup (22) oriented toward the pedal (6) when the pedal (6) is fully depressed.

11. The pedal path simulator according to claim 4, in which the cup (12) remote from the pedal (6) at least partially encompasses the cup (22) oriented toward the pedal (6) when the pedal (6) is fully depressed.

12. The pedal path simulator according to claim 5, in which the cup (12) remote from the pedal (6) at least partially encompasses the cup (22) oriented toward the pedal (6) when the pedal (6) is fully depressed.

13. The pedal path simulator according to claim 7, in which the cup (12) remote from the pedal (6) at least partially encompasses the cup (22) oriented toward the pedal (6) when the pedal (6) is fully depressed.

14. The pedal path simulator according to claim 1, in which the magnets are electromagnets.

15. The pedal path simulator according to claim 1, in which sensors (30) for detecting the pedal position are provided on a housing (5) that contains the first and second magnets (10, 20).

16. The pedal path simulator according to claim 2, in which sensors (30) for detecting the pedal position are provided on a housing (5) that contains the first and second magnets (10, 20).

17. The pedal path simulator according to claim 3, in which sensors (30) for detecting the pedal position are provided on a housing (5) that contains the first and second magnets (10, 20).

18. The pedal path simulator according to claim 4, in which sensors (30) for detecting the pedal position are provided on a housing (5) that contains the first and second magnets (10, 20).

19. The pedal path simulator according to claim 5, in which sensors (30) for detecting the pedal position are provided on a housing (5) that contains the first and second magnets (10, 20).

20. The pedal path simulator according to claim 7, in which sensors (30) for detecting the pedal position are provided on a housing (5) that contains the first and second magnets (10, 20).

21. The pedal path simulator according to claim 10, in which sensors (30) for detecting the pedal position are provided on a housing (5) that contains the first and second magnets (10, 20).

* * * * *

UNITED STATES PATENT AND TRADEMARK OFFICE
CERTIFICATE OF CORRECTION

PATENT NO. : 6,267,208 B1
DATED : July 31, 2001
INVENTOR(S) : Georg Koepff

It is certified that error appears in the above-identified patent and that said Letters Patent is hereby corrected as shown below:

<u>Title page,</u>
Item [54], should read as follows:

[54] PEDAL PATH SIMULATOR

Signed and Sealed this

Eleventh Day of December, 2001

*Attest:*

NICHOLAS P. GODICI
*Attesting Officer* *Acting Director of the United States Patent and Trademark Office*